(12) United States Patent
Lehrl et al.

(10) Patent No.: US 7,798,666 B2
(45) Date of Patent: Sep. 21, 2010

(54) SUPPORT FOR APPLIANCES TO BE WORN ON THE HEAD

(75) Inventors: Maria Lehrl, Mondsee (AT); Wolfgang Pesendorfer, Vienna (AT)

(73) Assignee: Leica Instruments Pte. Ltd., Singapore (SG)

( * ) Notice: Subject to any disclaimer, the term of this patent is extended or adjusted under 35 U.S.C. 154(b) by 714 days.

(21) Appl. No.: 10/504,419

(22) PCT Filed: Feb. 13, 2003

(86) PCT No.: PCT/AT03/00045

§ 371 (c)(1),
(2), (4) Date: Jan. 10, 2005

(87) PCT Pub. No.: WO03/069214

PCT Pub. Date: Aug. 21, 2003

(65) Prior Publication Data

US 2005/0168812 A1 Aug. 4, 2005

(30) Foreign Application Priority Data

Feb. 14, 2002 (AT) ............................ A 236/2002

(51) Int. Cl.
*F21V 21/084* (2006.01)
(52) U.S. Cl. ........................ 362/105; 362/106
(58) Field of Classification Search ............. 600/300, 600/301; 128/903–905, 920, 97.1; 362/105, 362/572, 804, 106; 351/123, 156, 205, 245; 607/109, 110, 139–141; 359/580

See application file for complete search history.

(56) References Cited

U.S. PATENT DOCUMENTS

| 2,426,958 | A | * | 9/1947 | Ulett, Jr. et. al. | ............ 600/383 |
| 2,606,293 | A | | 8/1952 | Knight | |
| 3,090,045 | A | | 5/1963 | Hurst | |
| 4,593,683 | A | * | 6/1986 | Blaha | ............ 600/249 |
| 5,357,957 | A | * | 10/1994 | Itil et al. | ............ 600/383 |
| 5,365,607 | A | | 11/1994 | Benevento | |
| 5,913,412 | A | | 6/1999 | Huber | |
| 5,954,642 | A | | 9/1999 | Johnson et al. | |

FOREIGN PATENT DOCUMENTS

| EP | 0 675 382 | 10/1995 |
| EP | 0 942 307 | 9/1999 |
| WO | 92/03756 | 3/1992 |
| WO | 96/09566 | 3/1996 |
| WO | 00/55673 | 9/2000 |
| WO | 01/38919 | 5/2001 |

\* cited by examiner

*Primary Examiner*—Michael C Astorino
*Assistant Examiner*—Kai Rajan
(74) *Attorney, Agent, or Firm*—Young & Thompson

(57) ABSTRACT

A support for appliances to be worn on the head includes a bow-shaped base and support elements in the area of its front end, in a further section, for example its center section, and support elements disposed on the bow in the area of its rear end. All support elements can be adapted to be adjustable relative to the bow. On one end of the bow, an appliance can be fastened. Such an appliance can be a visual aid or the like. On the other end of the bow, electronic components and/or a counterweight are provided for the purpose of balance and are preferably disposed in a housing linked with a slide for adjusting the support elements that rest on the back of the head.

26 Claims, 4 Drawing Sheets

SUPPORT FOR APPLIANCES TO BE WORN ON THE HEAD

BACKGROUND OF THE INVENTION

1. Field of the Invention

Figure 1:
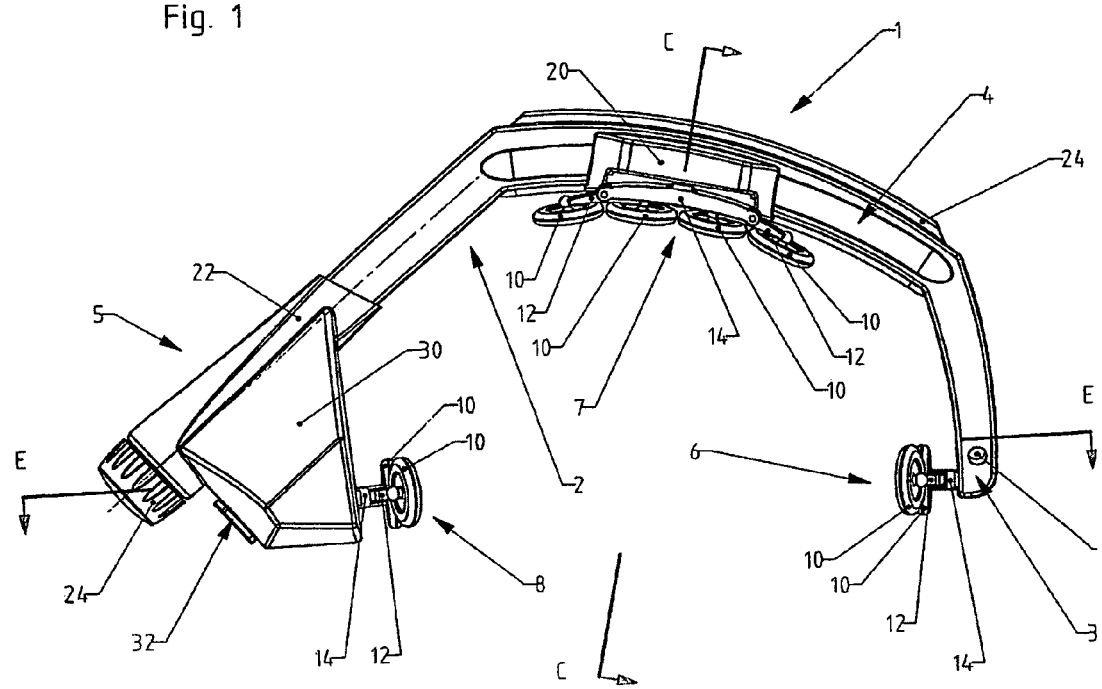

The invention relates to a support for devices which are to be worn on the head.

2. Description of the Related Art

These supports are known in the prior art, in which connection for example reference can be made to WO 01/003819.

The known supports can be used for example by surgeons in surgery for holding vision aids. The known supports are not only constructed in a relatively complex manner, they also cannot be easily matched to the shape and size of the head of the user. It is also difficult to put on the known support.

The known supports for devices which are to be worn on the head generally have a ring which encompasses the head and which in use on the head of the user is arranged similarly to a hatband, and a crown band which runs from the forehead to the back of the head of the user.

WO 01/003819 A discloses equalizing as much as possible, in these supports, the weight of the device which is attached to the support, for example a vision aid for surgeons, by counterweights which are mounted in the area of the back of the head in order to increase the comfort of wearing.

SUMMARY OF THE INVENTION

The object of the invention is to make available a support of the initially mentioned type which is simple in structure and is very comfortable to wear.

The support as claimed in the invention consists in its basic structure of a bow which extends from the front of the head (forehead) to the back of the head of a user and which is supported via several support elements on the head. Due to the support elements which are located on the bow the support as claimed in the invention can be easily matched to the shape of the head of the user by the support elements being changed with respect to their location and/or alignment.

The matching of the support as claimed in the invention to different head shapes and/or sizes in the support as claimed in the invention is made especially easy when support elements combined into groups are arranged on the bow of the support. In one embodiment of the support of the invention at least one group of support elements is adjustably mounted on the bow. Thus the support can be quickly matched to the size of the head and it becomes easier to put on/take off the support.

Within the framework of the invention it is preferable if the support elements are made in the manner of cushions.

The support elements can be supported to be able to swivel on the bow in several directions so that their alignment can be automatically matched to the alignment of the head of the user in the areas in which support elements adjoin. In order to still guarantee a secure fit of the support, it can be provided that the support elements can be freely swivelled only to a limited degree, therefore within a limited area.

In one practical embodiment it can be provided that support elements, optionally combined into groups of several support elements, are located on the end of the bow which lies in the area of the forehead of the user, on the end of the bow which lies in the area of the back of the head, and in the middle section of the bow.

It can be provided that the support elements are located on the front end of the bow and on the back end of the bow, each in a row which extends preferably transversely to the bow, conversely the support elements located in the middle section of the bow, therefore the support elements which fit tightly in the area of the crown of the head of the user, lie in at least two rows which are located on the two sides of the bow and which are aligned preferably essentially parallel to the bow.

A movement capacity of the support elements can be achieved by their being supported to be able to swivel on the bow, preferably on levers. Here it can be provided that the levers on which the support elements are located for their part are supported to be able to swivel by base levers which are pivotally supported on the bow of the support.

On the front end of the bow, therefore the end which lies in the area of the forehead of the user, there can be a connecting point for a device which is to be attached to the support. These devices can be vision aids which are used by surgeons or precision mechanics, for example with zoom and autofocus, for example vision aids of the construction described in WO 96/09566 A and/or WO 01/03819 A. On the support as claimed in the invention however also other devices which are to be worn on the head, such as displays, in which data, installation diagrams, and the like are displayed, night vision devices, spotlights, lights, protective devices (welding shields), protective shields and the like are attached.

In the support as claimed in the invention the support elements can be made differently and/or can consist of different materials, in order to match them to the respective location on the head of the user. Thus the type and configuration of the support elements can take into account whether they adjoin the skin or the hair of the user.

In one embodiment of the invention it can be provided that the support elements have cushions which are supplied with negative pressure in order to improve the fit of the support as claimed in the invention on the head of the user.

In order to achieve at least partial weight equalization between a device which is mounted on the front end of the bow of the support as claimed in the invention, which ends lies in the area of the forehead of the user, with the remaining part of the support as claimed in the invention, it can be provided that heavy components such as electronic components and the like, as well as connection points for transmission elements, such as for example sockets or infrared ports, for the connection of supply and/or data and/or control lines, are provided in the area of the back end of the bow. These heavy-weight components can be provided for example also in the area of the middle section of the bow.

In order to be able to easily match the support as claimed in the invention to the head size, it can be provided that the support elements which fit tightly in the area of the back end on the back of the head of the user are attached optionally via levers/base levers to a carrier which can be moved on the back end of the bow, for example a carriage. To adjust this carriage, for example there can be a set screw which is equipped with a control knob.

The support elements which are located in the middle section of the bow can be mounted to be able to move along the bow on a carrier, for example, a carriage, in order to be able to move it into a location which is favorable for contact with the crown of the head of the user of the support.

Swivelling means can be assigned to the connection point for the device which is to be attached to the support as claimed in the invention and which lies preferably in the area of the front end of the bow. With such a swivelling means the device can be swivelled out of the position of use into a position of nonuse. This is important for example in optical vision aids for surgeons when they want to obtain an overview of the surgical field for example without using the vision aid and must swivel the vision aid away for this purpose. Here it is provided that when the device is swivelled back into its position of use the base position is reached again in any case automatically and without further help. The swivelling, specifically swivelling in and/or out, can take place by hand or using a drive which is assigned to the swivelling means.

The bow of the support can be made hollow in order to accommodate in it lines for the power supply, control and/or data transmission from or to the device which is mounted on the bow. In addition, in the bow of the support, especially in the crown area, there can be a trough which is open to the top for holding lines, for example cold light lines.

Other details, features and advantages of the support as claimed in the invention follow from the description of one embodiment below using the drawings.

BRIEF DESCRIPTION OF THE DRAWING FIGURES

Figure 2:
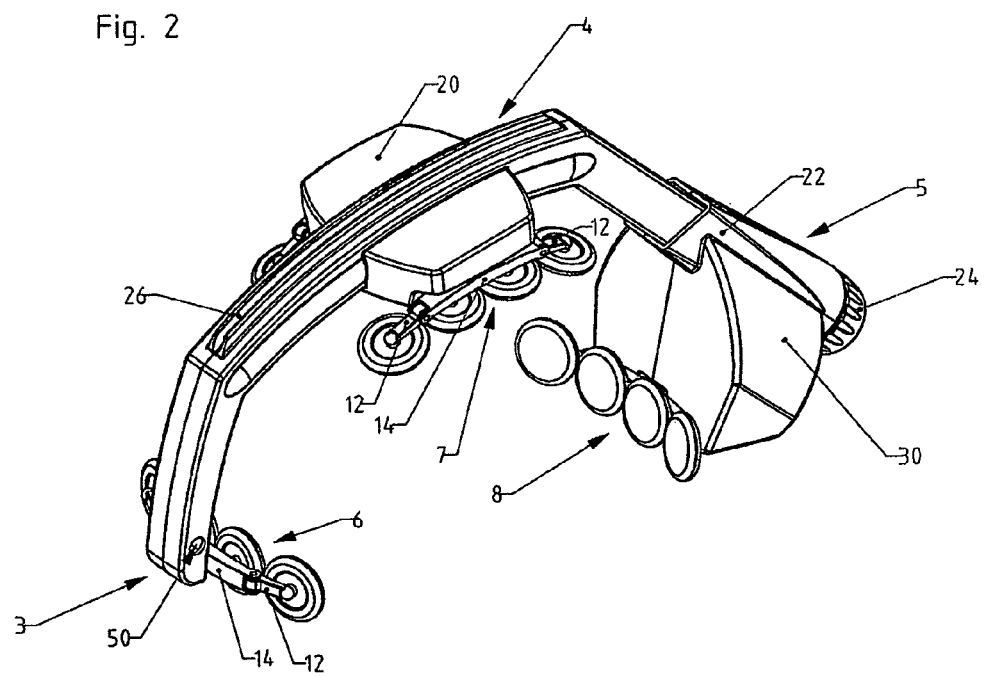
Figure 3:
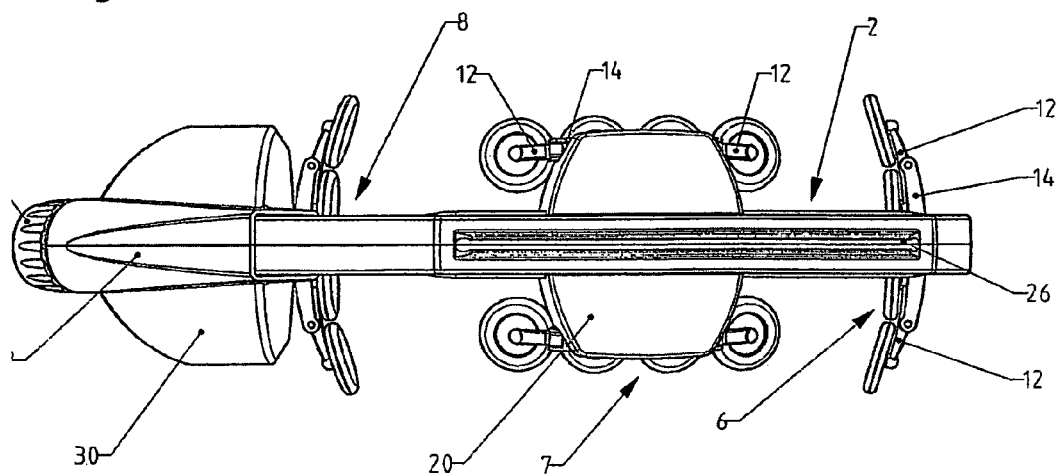
Figure 4:
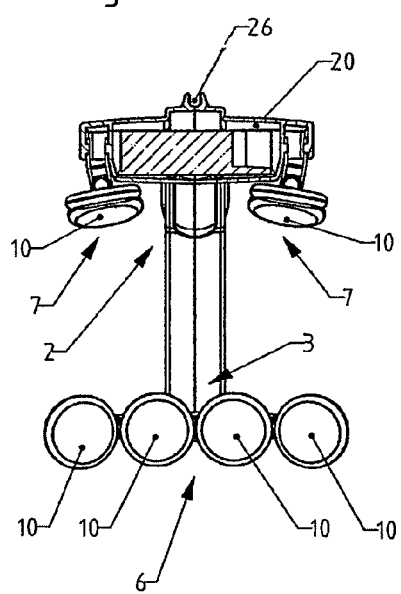
Figure 5:
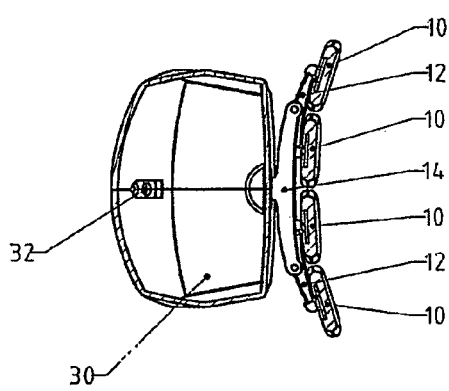
Figure 6:
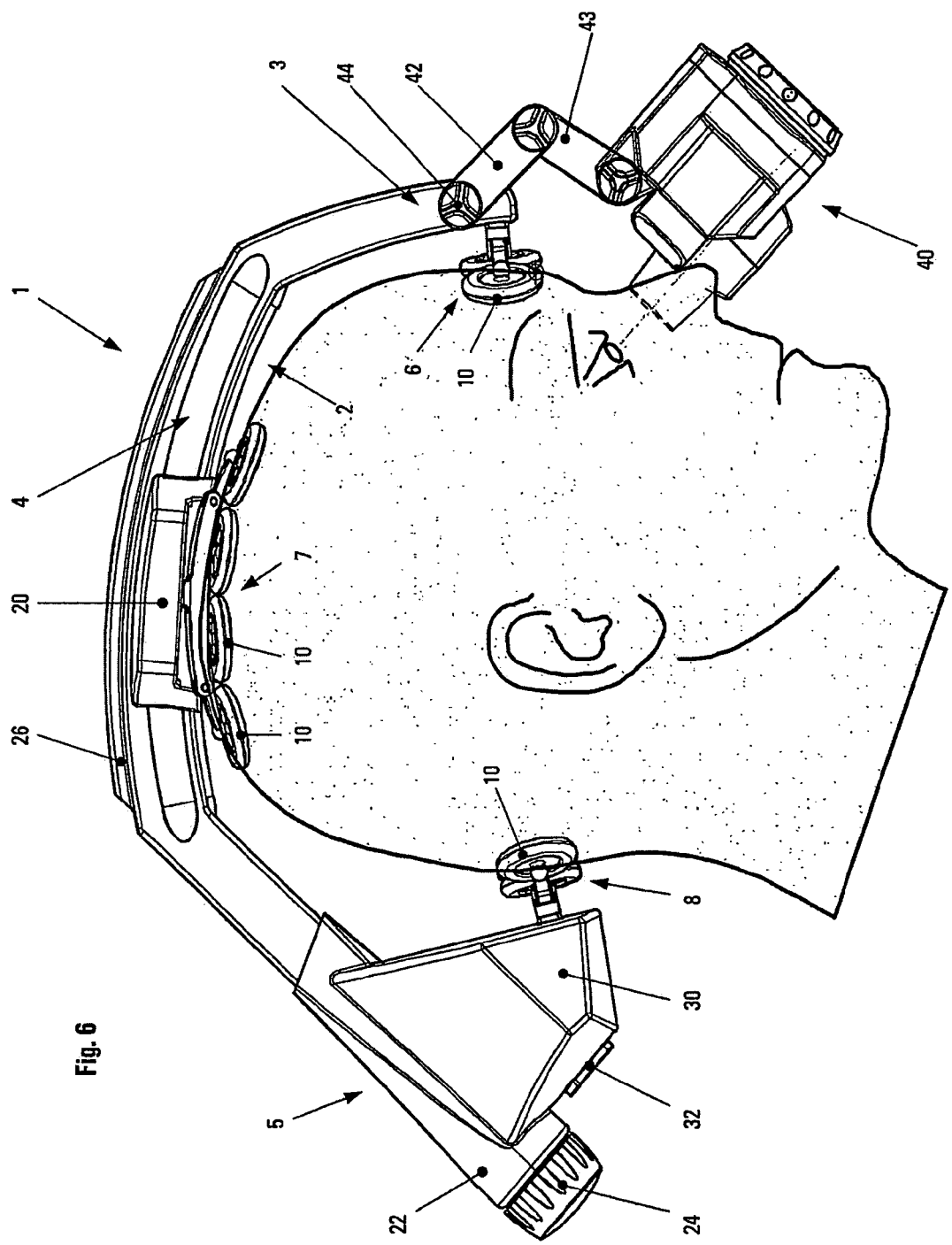
Figure 7:
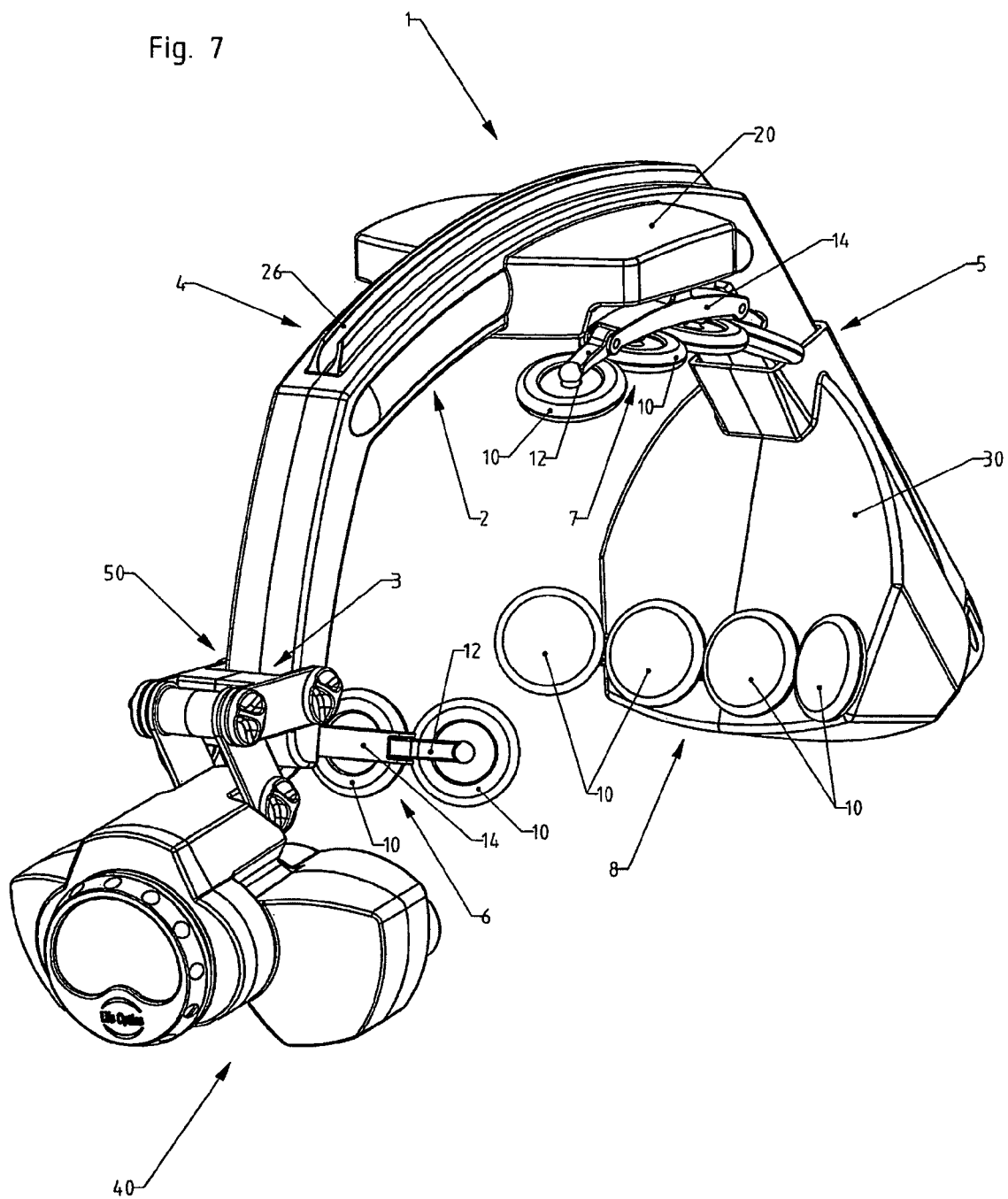

FIG. 1 shows a support as claimed in the invention without a device attached to it in a side view;

FIG. 2 shows the support from FIG. 1 viewed from obliquely forward and overhead, FIG. 3 shows the support from FIG. 1 viewed from overhead, FIG. 4 shows a section along line C-C in FIG. 1, FIG. 5 shows a section along line E-E in FIG. 1, FIG. 6 shows in a side view a support placed on the head of the user with a device attached to it in the form of an optical vision aid, and FIG. 7 shows in an oblique view from obliquely forward a support as claimed in the invention with the optical vision aid attached to it.

DETAILED DESCRIPTION OF THE INVENTION

As shown in FIGS. 1 and 2, the support 1 as claimed in the invention has a bow 2 with a front end 3 which can be located in the area of the forehead of the user, with a middle section 4 which is located in the area of the crown of the user, and with a back end 5 which, when the support 1 as claimed in the invention is located on the head of the user, is located in the area of the back of his head.

In the area of the front end 3, in the area of the middle section 4 and in the area of the back end 5 of the bow 2 of the support 1 as claimed in the invention, there are groups 6, 7, and 8 respectively of several support elements 10. The group 6 which is provided in the area of the front end 3 of the bow 2 in the embodiment has four support elements 10 which are made in the manner of round cushions. In the area of the middle section 4 of the bow 2 the group 7 has support elements 10 which are located on either side of the bow 2 (FIGS. 2 and 3) in the form of round cushions. The group 8 which is located in the area of the back end 5 of the bow 2 has four support elements 10 in the form of round cushions.

The support elements 10 of the group 6 in the area of the front end 3 and those of the group 8 in the area of the back end 5 of the bow 2 are each arranged essentially in a row which is aligned transversely to the lengthwise extension (plane of symmetry) of the bow 2. The support elements 10 of the group 7 which is located in the middle section of the bow 2 are arranged in two rows which are aligned on either side of the bow 2 and essentially parallel to its middle section 4 (FIG. 3).

So that the support elements 10 which are made in the embodiment as round cushions can be easily matched to the shape and/or position of the area of the head of the user on which they fit tightly, the support elements 10 are pivotally attached to the bow 2.

In the embodiment the support elements 10 are attached for example to be able to swivel on the levers 12 via pivot ball bearings. Each of these levers 12 which on its ends bears one cushion-shaped support element 10 at a time, in the area of its middle is articulated to another lever, the base lever 14. The base levers 14 for their part are pivotally supported on the bow 2 of the support 1. The levers 12 can be pivotable on the base levers 14 around an axle or around a pivot (ball joint). The base levers 14 on the bow 2 can be swivelled around an axle or around a swivelling point in the manner of a ball joint. A combination of these two swivelling possibilities (swivelling around an axle on the one hand and swivelling around a pivot (ball joint) on the other) are possible. For example, the support elements 10 on the levers 12 and the base levers 14 can be swivelled to all sides on the bow 2 and the levers 12 can be supported on the base levers 14 to be able to swivel around the axles which are preferably aligned perpendicular to the plane of symmetry of the bow 2.

The group 7 of support elements 10 in the middle section 4 of the bow 2 is mounted on a carriage 20 which can be moved in the lengthwise direction of the middle section 4 and which can be fixed in the desired position.

The group 8 of support elements 10 in the area of the back end 5 of the bow 2 is mounted on a carriage 22 which using a set screw which is equipped with an control knob 24 can be moved along the back end 5 of the bow 2, which end is straight in the embodiment shown.

The adjustability of the support elements 10 in the middle section 4 of the bow 2, which section is made bent flat in the embodiment shown, is used mainly to match the support 1 as claimed in the invention to the shape of the head of the user.

The adjustability of the support elements 10 in the area of the back end 5 of the bow 2, therefore of the support elements 10 which adjoin the back of the head of the user, when the support 1 is being used, is used mainly for putting on the support 1. For example, the support 1 with the group 8 of support elements 10 which has been pushed to the rear is put on—the support elements 10 of the groups 6 and 7 fit tightly on the head of the user—and then the support elements 10 are brought into contact with the back of the head by moving the carriage 22. Thus a secure fit of the support 1 on the head of the user is achieved by the support elements 10 of the group 6 fitting tightly in the area of the forehead, the group 8 in the area of the back of the head and the group 7 in the area of the crown.

The carriage 22 on the back, straight end 5 of the bow 2 on which the back support elements 10 are located, can have a housing 30 for holding electronic components and/or weights so that equalization of the weight between a device 40 (FIGS. 6 and 7) which is attached to the front end 3 of the bow 2 can be achieved, therefore the support 1 is essentially in equilibrium with support in the area of the group 7 of support elements 10.

In the wall of the housing 30 on the carriage 22 and/or on the bow 2 there can be at least one connecting point for transmission elements, for example a socket 32 or infrared ports for connection of power supply, data and/or control lines.

The bow 2 is preferably made hollow so that lines can be accommodated in its interior from and to the device 40 which has been attached to its front end.

In addition, especially in the crown area, on the outside of the bow there can be a groove 26 for holding at least one line (FIGS. 2 and 4). Here it can be for example a line to a cold light source which is attached to the bow 2 and which is located especially on the front end of the groove 26. This cold light source in the manner of a head-mounted spotlight illuminates the field of vision and thus follows the movements of the head of the user of the support 1 as claimed in the invention.

On the end 3 of the bow 2, which end is the front end in the embodiment and which is located roughly in the area of the forehead of the user of the support 1 as claimed in the invention (FIG. 6), there is a connecting point 50 for a device 40 which is to be worn on the head of the user via the support 1 as claimed in the invention.

In the illustrated embodiment, it is shown in FIGS. 6 and 7 that an optical vision aid 40, as is used for example by surgeons in surgery, can be mounted on the support 1 as claimed in the invention.

To do this, on the optical vision aid 40 there is a lever system 42, 43 which is made in the manner of a knee joint, and with its free end 44 is attached to the front end 3 of the bow 2 of the support 1. Here it is provided that at the connecting point 50 for the device 40 which is to be attached to the support 1 there is a swivelling drive which makes it possible to swivel the device 40 for example out of the position of use shown in FIG. 6 up into the readiness position. The swivelling drive of the connecting point 50 in the area of the front end 3 of the bow 2 is aligned such that when the device 40 is swivelled back into the position of use shown in FIGS. 6 and 7 the same (optionally preset) initial position is always reached. The swivelling can take place by hand or using the (motorized) swivelling drive.

This embodiment of the connecting point 50 makes it possible for example for a surgeon, during surgery, by swivelling up the vision aid 40 using the swivelling drive of the connecting point 50 (initiated for example by a foot-operated switch) to survey the entire surgical field and after swivelling the vision aid 40 back into the position of use (FIGS. 6 and 7), to continue the surgery. It is advantageous if the optical vision aid 40 after swivelling back again assumes exactly the position of use which it had before. The position of use can take place by adjusting the lever system 42, 43, therefore the angle which is assumed by the two parts of the lever system 42, 43 with the vision aid 40 on the one hand and the front end 3 of the bow 2 on the other, and to one another.

In summary, one preferred embodiment of the invention can be described as follows:

A support 1 for devices 40 which are to be worn on the head has an essentially bow-shaped base body 2 and in the area of its front end 3 has support elements 10 which adjoin the forehead of the user, in another, for example in its middle section 4, support elements 10 which in the area of the crown adjoin the head of the user, and support elements 10 which are located in the area of its back end 5 on the bow 2 and which adjoin the back of the head of the user. All support elements 10 can be adjustable to the bow 2. A device 40 can be attached to one end 3 of the bow 2, especially the front end. Such a device 40 can be a vision aid or the like. On the other, especially the back end 5 of the bow 2, as weight equalization there are electronic components and/or a counterweight, preferably in a housing 30 which is connected to a carriage 22 for adjusting the support elements 10 which adjoins the back of the head.

The invention claimed is:

1. A support (1) for devices (40) which are to be worn on a head of a user, comprising:
a bow-shaped base body (2) comprising several support elements (10) adapted to be placed against the head of the user;
wherein the support elements (10) support said support (1) on the head in an area of a front end (3), an area of a middle section (4), and an area of a back end (5) of said bow-shaped base body (2);
said support elements (10) being supported by ball joints configured for swiveling movement freely to all sides on the bow-shaped base body (2) via levers (12, 14); wherein
said support elements (10) in the area of the front end (3) of the bow-shaped base body (2), are located in a position in an area of a forehead of the user,
said support elements (10) in the area of the middle section (4) of the bow-shaped base body (2) are located in a position in an area of a crown of the head of the user; and
said support elements (10) in an area of the back end (5) of the bow-shaped body (2) are located in a position in an area of a back of the head of the user;
wherein the support elements (10) in the area of the back end of the bow-shaped base body (2) are located on a carriage (22) which can be moved along the back end (5) of the bow-shaped base body (2) wherein the support elements (10) are supported for swiveling movement on the levers (12);
said levers (12) are supported for swiveling movement on the bow-shaped base body (2) via base levers (14), and a rotatable actuating device (24) that adjustably moves said carriage (22) along the back end (5) of the bow-shaped base body (2); and
a connecting point (50) located at said front end (3) of the bow-shaped base body (2) to attach a surgical vision aid device (40).

2. The support as claimed in claim 1, wherein support elements (10) are combined into several groups (6, 7, 8) of two or more support elements (10).

3. The support as claimed in claim 1, wherein the support elements (10) have cushions which can be placed against the head of the user.

4. The support as claimed in claim 1, wherein on the carriage (22) there is a housing (30) with a holding space for electronic components or counterweights.

5. The support as claimed in claim 1, wherein on at least one of the carriage (22) and the bow-shaped base body (2) there is at least one connecting point for transmission elements.

6. The support as claimed in claim 1, wherein the support elements (10) which are located in the middle section (4) of the bow-shaped base body (2) are arranged in at least two rows which run parallel to the bow-shaped base body (2).

7. The support as claimed in claim 1, wherein the support elements (10) are carried by a carriage (20) which is movably arranged in the middle section (4) of the bow-shaped base body (2).

8. The support as claimed in claim 1, wherein the support elements (10) are located on the front end of the bow (3) in a row which is aligned transversely to the bow-shaped base body (2).

9. The support as claimed in claim 1, wherein the support elements (10) are located on the back end (5) of the bow-shaped base body (2) in a row which is aligned transversely to the bow-shaped base body (2).

10. The support as claimed in claim 1, wherein a swiveling drive is assigned to the connection (50) for the device (40) which is to be attached to the support (1).

11. The support as claimed in claim 10, wherein a device (40) which is attached to the connecting point (50) can be moved by the swivelling drive, proceeding from a given, optionally adjustable base position.

12. The support as claimed in claim 1, wherein the bow-shaped base body (2) is hollow.

13. The support as claimed in claim 1, wherein on the bow-shaped base body (2) there is a groove (26).

14. The support as claimed in claim 13, wherein there is a groove (26) in the area of the middle section (4) of the bow (2).

15. The support as claimed in claim 1, which is equipped with at least one sensor which adjoins the head of the wearer and which accepts measured physiological values and current pulses of the wearer.

16. The support as claimed in claim 15, wherein at least one of the support elements (10) is made as a sensor.

17. The support as claimed in claim 1, wherein on the bow-shaped base body (2) there is at least one housing (30) with a holding space for electronic components.

18. The support as claimed in claim 1, said support elements (10) being the sole support of said support (1) on the head.

19. The support as claimed in claim 1, said bow-shaped base body (2) being the sole interconnection between said support elements (10).

20. A support (1) for devices (40) which are to be worn on a head of a user, comprising:
   a bow-shaped base body (2) having a front end (3), a middle section (4) and a back end (5);
   a plurality of support elements (10) that are bourn by the bow-shaped base body (2), the support elements (10) being configured to be placed against the head of the user, there being support elements (10) in an area of the front end (3), in an area of the middle section (4) and in an area of the back end (5), the front end (3) being located in a position in an area of a forehead of the user, and the area of the middle section (4) being located in a position in an area of a crown of the head of the user, and the area of the back end (5) being located in a position in an area of a back of the head of the user;
   a plurality of ball joints configured to support said support elements (10), the ball joints being adapted to provide swiveling movement freely to all sides on the bow-shaped base body (2) via levers (12, 14);
   a carriage (22) which can be moved along the back end (5), the support elements (10) in the area of the back end (5) being located on the carriage (22) and which can be moved along the back end (5);
   a rotatable actuating device (24) that adjustably moves said carriage (22) along the back end (5); and
   a housing (30) on the carriage, the housing (30) having a holding space containing at least one of electronic components or counterweights;
   wherein the support elements (10) are supported for swiveling movement on the levers (12), and the levers (12) are supported for swiveling movement on the bow-shaped base body (2) via base levers (14); and
   a connecting point (50) located at said front end (3) of the bow-shaped base body (2) to attach a surgical vision aid device (40).

21. The support as claim in claim 20, wherein the support elements (10) are cushions.

22. The support as claimed in claim 20, wherein the support elements (10) in the area of the middle section (4) are mounted on a carrier (20) which is configured to move in a lengthwise direction of the middle section and which can be fixed in a desired position.

23. The support as claim in claim 20, wherein the rotatable actuating device (24) is a set screw equipped with a control knob.

24. The support as claimed in claim 20, wherein the support elements (10) in the area of the back section (5) are configured to be brought into contact with the back of the head by moving the carriage (22).

25. The support as claimed in claim 20, wherein the at least one of electronic components or counterweights provide equalization of weight between a device attached to the front end (3), thereby providing equilibrium to the area of the middle section (4).

26. The support as claim in claim 20, wherein the at least one of electronic components or counterweights provide equalization of weight between an optical vision aid (4) attached to the front end (3), thereby providing equilibrium to the area of the middle section (4).

* * * * *